United States Patent
Pezzaniti

(10) Patent No.: US 10,031,026 B2
(45) Date of Patent: Jul. 24, 2018

(54) SHORT WAVE INFRARED POLARIMETER

(71) Applicant: POLARIS SENSOR TECHNOLOGIES, INC., Huntsville, AL (US)

(72) Inventor: J Larry Pezzaniti, Huntsville, AL (US)

(73) Assignee: Polaris Sensor Technologies, Inc., Huntsville, AL (US)

( * ) Notice: Subject to any disclaimer, the term of this patent is extended or adjusted under 35 U.S.C. 154(b) by 0 days.

(21) Appl. No.: 15/498,233

(22) Filed: Apr. 26, 2017

(65) Prior Publication Data

US 2018/0094980 A1 Apr. 5, 2018

Related U.S. Application Data

(63) Continuation of application No. PCT/US2017/027039, filed on Apr. 11, 2017.

(60) Provisional application No. 62/320,880, filed on Apr. 11, 2016.

(51) Int. Cl.
*G01J 4/02* (2006.01)
*G02B 5/30* (2006.01)
*G01J 5/58* (2006.01)

(52) U.S. Cl.
CPC . *G01J 4/02* (2013.01); *G01J 5/58* (2013.01); *G02B 5/3025* (2013.01); *G01J 2005/586* (2013.01)

(58) Field of Classification Search
CPC .......... G01J 4/02; G01J 5/58; G01J 2005/586; G02B 5/3025
See application file for complete search history.

(56) References Cited

U.S. PATENT DOCUMENTS

| | | | | |
|---|---|---|---|---|
| 2011/0266443 | A1* | 11/2011 | Schimert | G01J 1/02 250/338.4 |
| 2012/0008133 | A1* | 1/2012 | Silny | G01J 3/02 356/73 |
| 2013/0075585 | A1* | 3/2013 | Kobayashi | G01J 1/0242 250/208.1 |
| 2015/0192758 | A1* | 7/2015 | Yamagata | G02B 5/3025 348/360 |
| 2016/0037089 | A1* | 2/2016 | Silny | H04N 5/332 250/332 |
| 2016/0170110 | A1* | 6/2016 | Pau | G02B 5/3016 356/364 |

FOREIGN PATENT DOCUMENTS

WO WO2014/145792 A1 * 9/2014 ............... G02B 5/30

OTHER PUBLICATIONS

Lee Mastroianni, Short-Wave Polarimeteric Imager, Jan. 2016, Navy, SBIR 2016.1 Topic N161-057, pp. 108-109.*

* cited by examiner

*Primary Examiner* — Michael P LaPage
(74) *Attorney, Agent, or Firm* — Joseph S. Bird, III; Maynard Cooper & Gale

(57) ABSTRACT

A short wave infrared polarimeter comprising a pixelated polarizer array and an Indium-Gallium-Arsenide ("InGaAs") focal plane array. The short wave infrared polarimeter optionally includes a micro-lens array and/or an aperture layer.

10 Claims, 7 Drawing Sheets

SHORT WAVE INFRARED POLARIMETER

PRIORITY STATEMENT

This application is a continuation of international application no. PCT/US17/27039, filed on Apr. 11, 2017, which is currently pending. International application PCT/US17/27039 claims priority to, and the full benefit of, U.S. provisional patent application No. 62/320,880 filed on Apr. 11, 2016. International application PCT/US17/27039 is incorporated herein by reference in its entirety.

STATEMENT REGARDING GOVERNMENT SPONSORED RESEARCH

This invention was partially supported by grant number N00014-16-P-1033 from the U.S. Office of Naval Research.

FIELD OF THE INVENTION

The field of invention is shortwave infrared polarimetry.

WRITTEN DESCRIPTION

The invention disclosed comprises a shortwave infrared polarimeter ("SWIP") 1 for shortwave infrared ("SWIR") radiation in the 700 to 2,500 nm range, along with related components and processes. The SWIR part of the optical spectrum scatters less from atmospheric aerosols than other wavelengths, so SWIR allows improved contrast in many situations for passive optical sensing, i.e., remote sensing. SWIR is useful in maritime environments because it transmits through marine aerosols better than other parts of the optical spectrum. The SWIR relies largely on ambient illumination and is therefore primarily useful only during the day. The main exception to this is the ability to image at night-time using low light levels from the so-called sky glow resulting from faint emission from atmospheric aerosols at night. Sensing in the SWIR range has only recently been made practical by the development of new technologies, such as the Indium-Gallium-Arsenide ("InGaAs") focal plane array (FPA). As used throughout, dimensions are only exemplary and can vary, unless expressly stated otherwise.

Figure 1:
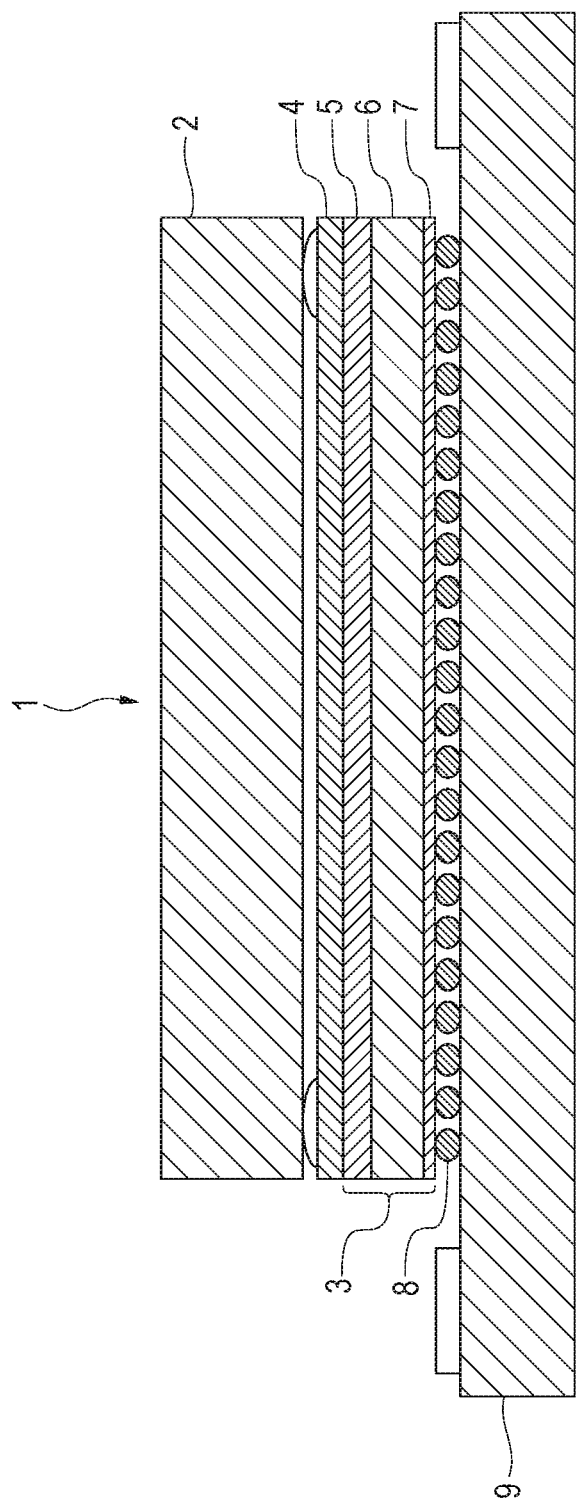
FIG. 1 is a cross-section view of a schematic of one embodiment of the SWIP herein.

As in one embodiment in FIG. 1, the SWIP 1 herein comprises a polarizing pixel array (PPA) 2 comprising numerous individual pixels 2a which are aligned to and brought into close proximity to the pixels 3a of an InGaAs FPA 3, such that interlaced images of different polarization states are collected in a single image and are used to compute intensity and polarized images of the scene. Various formulations of the InGaAs substrate for the array may cover sub regions of this spectral band, for example one common spectral band is 900 to 1700 nm. Other InGaAs FPAs cover the following spectrum bands such as the so-called VIS-Gas waveband from 400-1700 nm, and the extended InGaAs of 700-2500 nm.

Polarimetry in the SWIR is primarily reflection dominant and polarimetric signatures rely on the interaction of the ambient light with object surfaces through the reflection process and are dependent on the geometry of the reflecting surface relative to the ambient source(s) and the sensor look direction, the material (refractive index) properties, and the nature of the surface (roughness magnitude and homogeneity). SWIR polarimetry is a different mode of detection in that it depends on more surface properties than conventional intensity imaging. Accordingly, more information about the object may be extracted from a polarized image than can be extracted from a conventional image that has intensity only. A polarized image is exceptionally useful for detecting man-made objects that are surrounded by natural clutter such as bushes, grass, trees and dirt, because the man-made object is smoother than the natural clutter and has a higher fraction of polarized light than the natural clutter. In maritime environments, objects on the water's surface are polarized differently than the water. The water surface tends to be uniformly polarized, whereas an object floating on the water is not uniformly polarized. That is, the geometry of the floating object has many different angles of reflection and the water surface has just one. Therefore the polarization signature of the floating object is different from its background.

Figure 2:
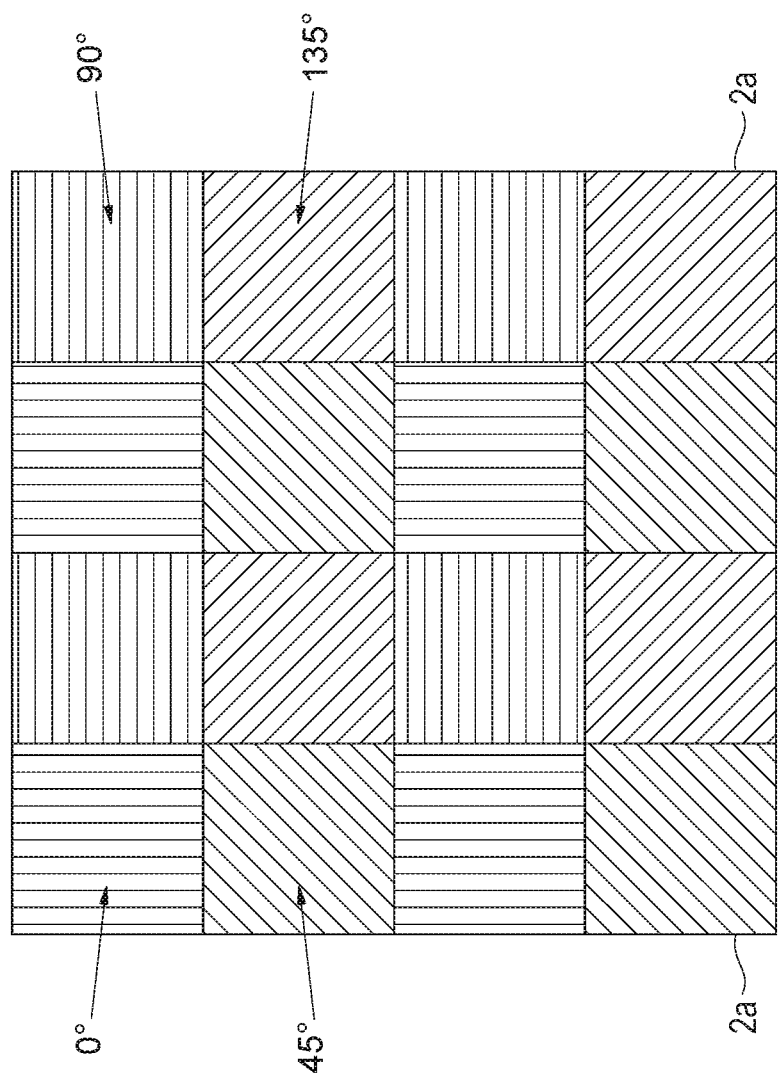
FIG. 2 depicts the pixelated polarizer array ("PPA") in the embodiment with a wire grid polarizer array showing the orientations on the individual polarizers for one embodiment of the invention.

The polarizer elements in the PPA 2 are, in one embodiment, of the wire grid type of polarizer, as shown in FIG. 2 which is a plan view of a portion of the PPA. The individual lines in each pixel 2a represent wires which extend to the edges of a pixel. The wire grid type PPA is used because, among other reasons, it has a wide angular acceptance cone and operates over a wide spectral bandwidth. The wide acceptance cone allows the polarizer to be positioned at the focal plane of the image. This allows the optical system to operate with a low f-number lens. For an f/1 (f-number) lens, the ray cone incident on the PPA has approximately a 30 degree half angle. The transmission properties and polarization rejection of the wire grid PPA 2 is optimal up to angles exceeding 30 degrees and it can operate well over wide spectral bandwidths.

The wire grid PPA 2 can be deposited directly on a flat substrate or on a flat substrate that has an Anti-Reflection ("AR") coating 4 deposited on its surface. Substrates that can be used must transmit in the infrared. A number of optical glasses can be used in the SWIR for substrates and include fused silica and display grade glass. The wires are deposited on the virgin substrate or AR coated substrate using standard lithographic and etching processes. A PPA manufactured on flat substrates such as these can be very flat and vacuum compatible so that the structure can be used inside a vacuum sealed package. Flatness is important so that spacing between the PPA pixels and InGaAs pixels can be maintained across the entire array to within a few microns.

Other formulations of pixelated polarizer arrays are possible. The invention herein is broad enough to comprise, in lieu of the wire grid type polarizer, any other type polarizer having micro-components which preferentially absorb energy in one state and transmit the energy in a second state. Such polarizers could include any set of microstructures created by polymers or other nanomaterials.

FIG. 2 shows an embodiment of the PPA as a wire grid type polarizer showing an example 2×2 pattern, and each of the 16 squares in FIG. 2 is an individual PPA pixel 2a in a 2×2 pattern. That is, the 2×2 pattern is such that each pixel has its transmission axis oriented at a particular angle, such as 0, 45, 90 and 135 degrees. In FIG. 2, two of the 16 pixels are marked with the element label 2a, but each of the 16 squares in FIG. 2 is also a PPA pixel 2a. The pitch of the pixels 2a in FIG. 2 matches the pitch of the InGaAs FPA pixels 3a. The polarization transmission axis is orthogonal to the long axis of the wires. Radiation that is polarized with its electric field parallel to the plane parallel to the wires is reflected and absorbed and radiation polarized perpendicular to the wires is transmitted. The efficiency of the polarizer is defined as how efficiently it transmits the desired polarization state and the extent to which it extinguishes the undesired (orthogonal) polarization state, i.e., the extinction ratio. Several parameters of the wire grid polarizer determine the extinction ratio. These parameters include the period of the wire grid (spacing between neighboring wires), the duty cycle of the wire grid (ratio of wire width to spacing between wires), the thickness of the wires, the material of the wire, the substrate refractive index, the prescription of the AR coating upon which the wires are deposited. The substrate is AR coated to maximize transmission of the desired polarization state unless the substrate has a very low refractive index, such as fused silica. The wires can be deposited on top of, or in any of the layers of, the AR coating. The optimal choice for which layer to deposit the wires depends on the waveband (wavelength) of operation, the angles of incidence in which the polarizer must operate, the polarizer substrate and the properties of the wire grid (pitch, duty cycle, wire material, wire thickness). The pitch, or size, of the PPA pixels is chosen to exactly match the pitch of the FPA pixels. The wire grid polarizer can designed using Rigorous Coupled Wave Analysis (RCWA) code (such as G-solver commercial RCWA code), or Finite Element Methods (such as Ansoft HFSS modeling code). This latter software utilizes the finite-element-method (FEM) to solve the electromagnetic fields that propagate through and scatter from the wire grid polarizer elements.

The PPA 2 and the InGaAs array 3 are pixelated and aligned so that that one pixel in each layer is aligned with one pixel in each the other layer. The overall dimension of each PPA pixel 2a is equal to the size of the InGaAs FPA pixel 3a. The transmission of unpolarized incident SWIR through the wire grid array is, in one embodiment, approximately 45%, or within a range of 25-50%, and the extinction ratio exceeds 10:1 or greater. The transmission of completely polarized light parallel to the transmission axis of the polarizer should be closer to 95%, when the grating is optimized by appropriate choices of the properties of the wire grid (pitch, duty cycle, wire material, wire thickness). Extinction ratios over 100:1 or approaching 1000:1 or even higher are possible when tested independent of the FPA. When integrated with the FPA, the effective extinction ratio is equal to or greater than 10:1 because of the cross-talk between neighboring pixels of the FPA.

Figure 3:
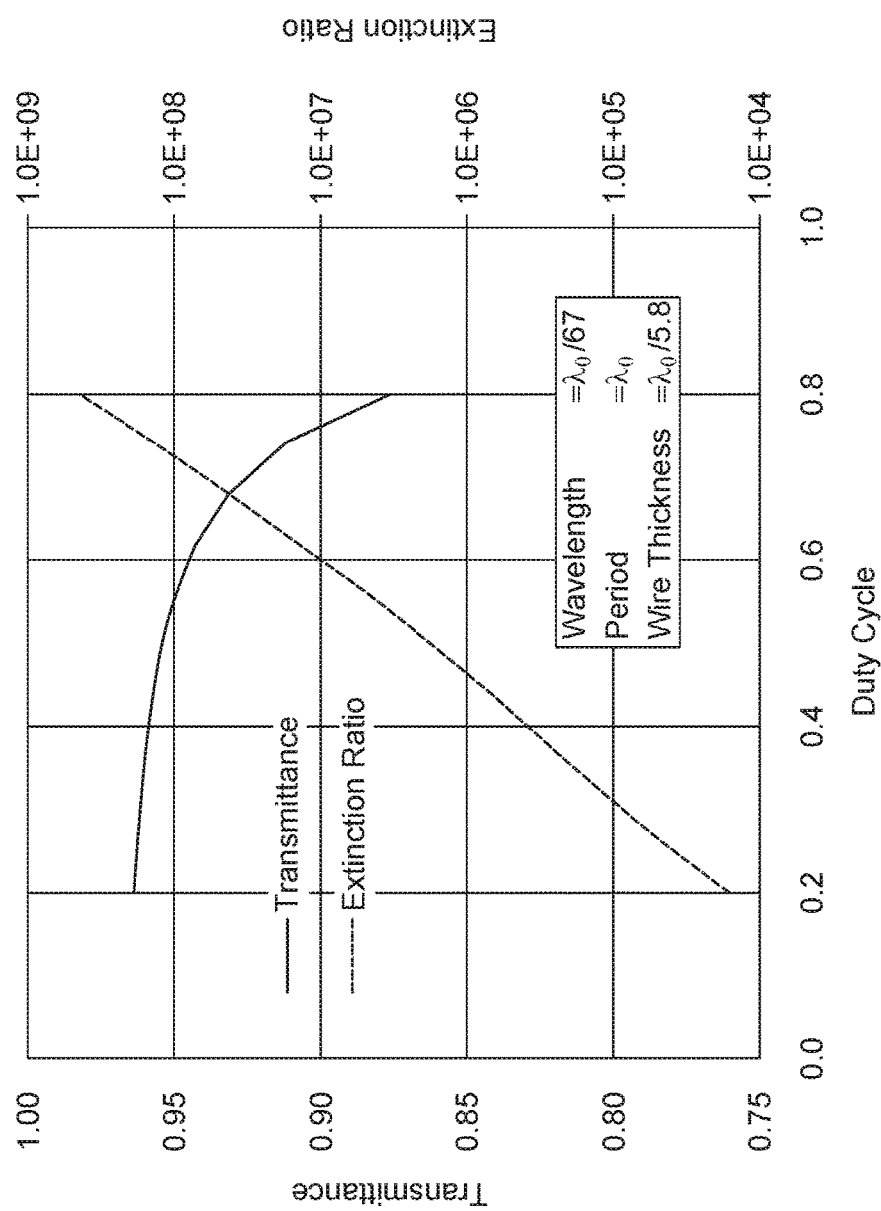
FIG. 3 is a matrix with variables for transmittance, duty cycle and extinction ratio

The invention requires a balancing of design criteria involving aspect ratio, duty cycle and the clear bottoms of the gratings. The extinction ratio improves for increasing duty cycle but it detrimentally affects the transmittance. Note that FIG. 3 shows representative data for transmittance and extinction ratio as a function of duty cycle. As the duty cycle increases, the extinction ratio increases in an almost linear fashion, but the transmittance declines in a curved function. This figure illustrates the dependence of the grating period on the polarizing performance which is directly related to polarization performance and transmission. The extinction ratio must be high (>10:1) to maintain polarization contrast in the polarized image.

One method of assembly is with a flip-chip bonder to align and bond the pixelated polarizer wire grid array onto the top surface of the focal plane array ("FPA"). The flip-bonder uses features on the top surface of the FPA and the wire-grid side of the polarizer to achieve alignment. The fiducial marks for the wire grid PPA to ensure the tightest alignment tolerances possible (<+/−1 μm), which are within a range of standard industry flip-chip bonders.

In one embodiment, an InGaAs FPA 3 comprises an indium phosphide (InP) substrate 5, an InGaAs absorption layer 6, and an ultrathin InP cap 7 that is bump bonded to a readout integrated circuit (ROIC) 9, as in FIG. 1. The InP cap 7 side of the FPA chip 3 is electrically connected with Indium bump-bonds 8 to a ROIC 9 using a flip chip bonder. The flip chip bonder is a precision alignment and bonding tool set that image fiducial marks on the InP cap 7 side of the FPA chip 3 and images the top side of the ROIC 9. It then moves the FPA chip, adjusting for X-Y-tip-tilt-rotation until the FPA chip and ROIC are aligned to within a very tight tolerance to within less than 1 micron. The alignment precision is dependent on the flip chip bonder, the fiducial marks, and the process. The flip chip bonders align the FPA to the ROIC to <+/−1 μm in X-Y across the entire array.

Bonding of the PPA 2 to the InGaAs FPA 3 is achieved in the same way and may be done with either epoxy or Indium solder. In one embodiment Indium bumps 8 are used for bonding since this same bonding method is used to bond the FPA to the ROIC and depends on the top surface of the AR coating 4 on the PPA 2. When Indium is used, the top surface must have good adhesion compatibility and be able to standup to solder reflow temperatures.

In all embodiments, the invention comprises a PPA 2 and an InGaAs FPA 3, and the above description is one of a number of designs of, and methods for constructing an SWIP 1.

The PPA 2 has an inherent ½ pixel Instantaneous Field of Vision ("IFOV") error. The Stokes data is typically calculated at the center of a 2×2 super-pixel 15 (as shown in the left hand image of FIG. 7) which comprises all four possible polarization states as shown in FIG. 2. As used herein, "super-pixel" designates a 2×2 group of pixels with different polarization states, and can also sometimes refer to the corresponding IgGaAs pixels, as shown by the context herein. A PPA 2 can report spurious polarization signatures of scenes containing high spatial frequency content. To understand this, imagine the tip of a flag pole is illuminated with a bright light and imaged onto a single horizontally polarized pixel 2a of a PPA. Further, assume that the light reflected from the flag pole tip is completely unpolarized. If the background surrounding the tip of the flag pole is dark, then the horizontally polarized pixel will be bright and the neighboring vertically polarized pixel will be dark. The sensor erroneously would report a highly polarized flag pole tip.

Figure 5:
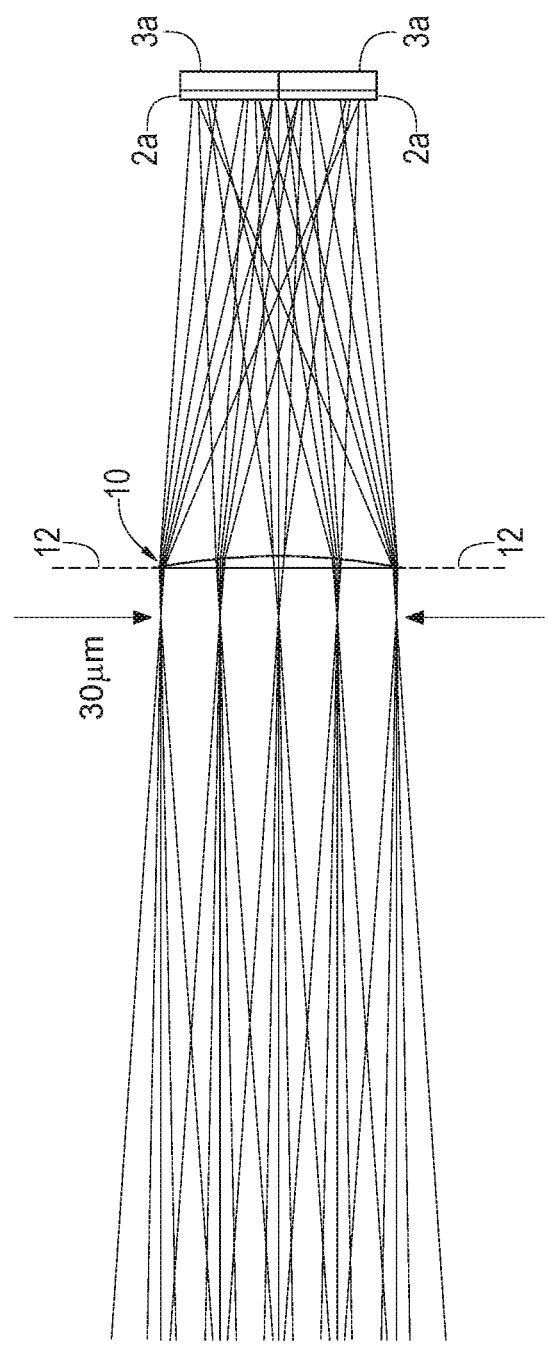
FIG. 5 is a schematic of the position of the micro lens array pixel in relation to the wire grid and InGaAs arrays, and a ray diagram.
Figure 6:
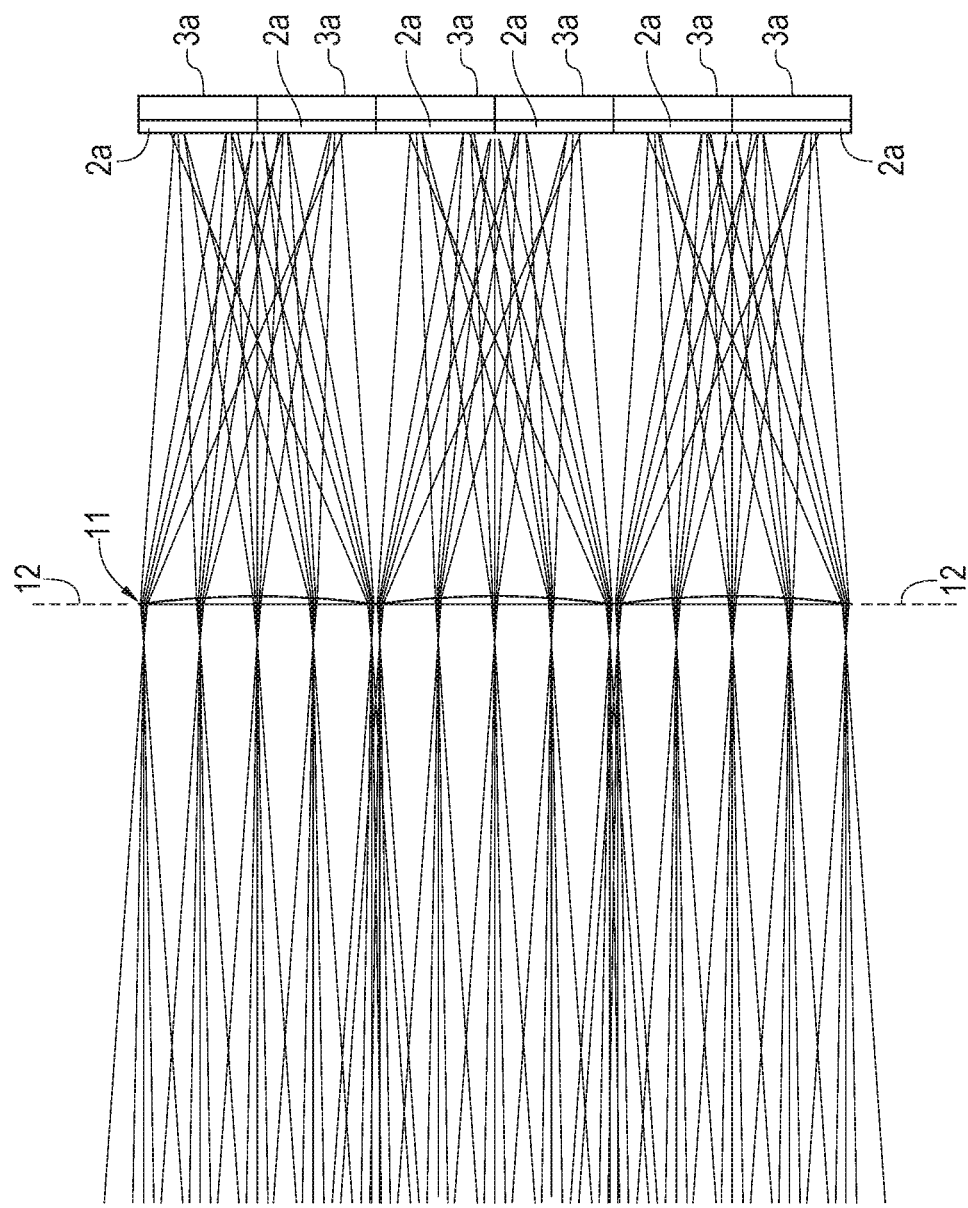
FIG. 6 is a schematic of a portion of a micro lens array in relation to the wire grid and InGaAs arrays, and a ray diagram.
Figure 7:
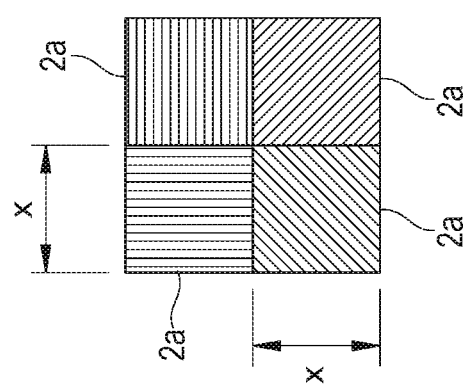
FIG. 7 includes a diagram of the polarizer array with pixels in four orientations, as well as a section view of the polarizer array and the InGaAs array.
Figure 7:
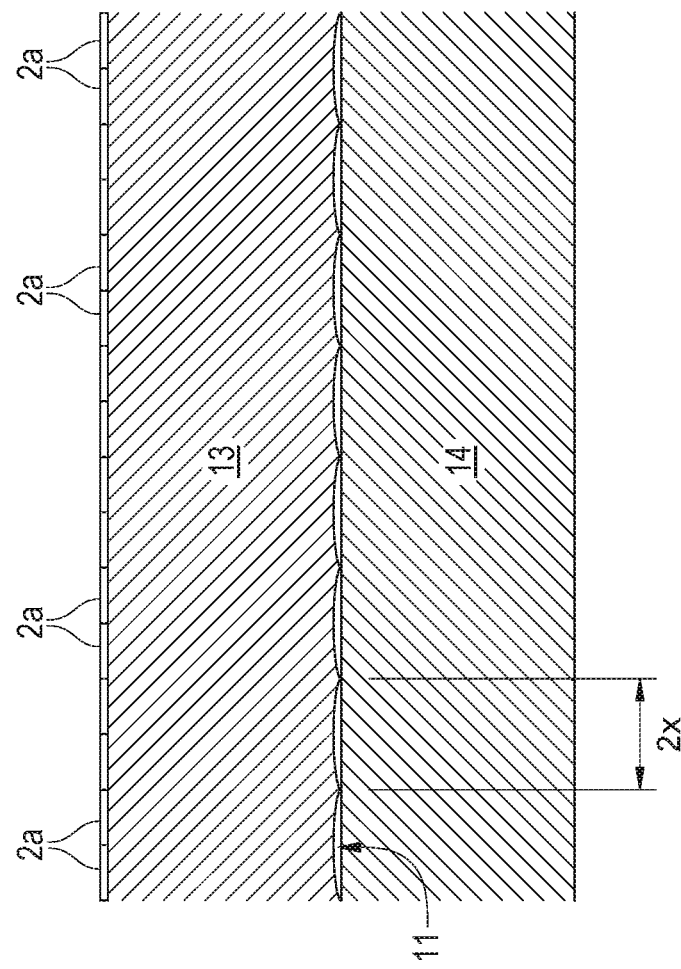

FIGS. 5 and 6 depict portions of a micro-lens array 11 and radiation which as passed through an objective lens of an optical system. The micro-lens array 11, a portion of which is depicted in FIGS. 6 and 7, has been formed directly over the PPA 2 to eliminate these errors. In this design a micro-lens array 11 is placed such that the micro-lens forms an image of the system aperture onto the InGaAs FPA 3. FIG. 5, depicting a single micro-lens pixel 10 in the micro-lens array 11, shows a design approach that is effective and manufacturable, providing radiation to a 2×2 array of pixels (i.e, a super-pixel 15) of the InGaAs FPA. The rays from a standard SWIR objective lens (not depicted) come to focus at an intermediate image plane 12. The micro-lens array 11 is placed in close proximity to the intermediate image plane. The micro-lens at that location acts as a field lens that reimages the entrance pupil of the optical train onto the active region of the focal plane array. The PPA 2 is placed within a few microns of each active region of the InGaAs FPA pixels (greater than one half the InGaAs FPA pixel pitch). Since, for any field point, the intensity distribution across the entrance pupil is uniform, the intensity distribution across the neighboring pixels of the InGaAs FPA will also be uniform. In the field point in the center of a micro-lens, the light rays from that field point are spread uniformly across the Horizontal and Vertical polarized pixels. In 2-dimensions, light for that center field point will spread over the entire 2×2 super-pixel 15 of the FPA, so that the energy spreads uniformly over an entire 2×2 super-pixel 15. Note that for the field point at the top of a micro-lens 10 and field point at the bottom of the micro-lens 10 the same is true. The light spreads uniformly across the pixels.

Now if the flag pole is imaged onto a single pixel of the InGaAs array with the micro-lens array, rays from the flag pole will be distributed uniformly amongst the four pixels in a super-pixel 15 and the unpolarized light will be transmitted equally amongst the four polarized pixels, and the sensor will correctly compute the degree of polarization of the flag pole as zero.

FIG. 6 shows a portion of the micro-lens array 11. Each micro-lens feeds light into a unique super-pixel comprising a 2×2 array of FPA pixels. No matter where the light from a field point is focused on a micro-lens, the light is always evenly distributed amongst the four pixels in the super-pixel 15.

The power of the refractive surface of the micro-lens and the distance from the micro-lens to the polarizer can be adjusted to optimize how the energy is distributed across the micro-lenses. To make this adjustment, the primary lens is focused until the image is as crisp as possible, just like a conventional imager is focused.

FIG. 7 includes silicon as the micro-lens substrate 14. However other materials that are transmissive in the SWIR band can be employed in other embodiments. In this embodiment, the micro-lenses are fabricated onto a 0.5 mm thick Silicon wafer. The sag of the lenses in one embodiment is approximately 2 microns. After the micro-lenses are fabricated on the surface, a layer 13 of epoxy-based negative photoresist, in one embodiment SU-8, is deposited on top of the micro-lens array 11. An AR coating designed to give high transmission into the SU-8 layer is deposited on the silicon micro-lens array before the SU-8 layer is added. The SU-8 layer can be thermally cured (cross-linked) so that it is a permanent structure. Once the micro-lenses and SU-8 are completed, the SU-8 layer is AR coated (AR layer not depicted in FIG. 7) and the wire grid structure is deposited on top of the SU-8 layer. Finally, a thin protective layer of HgF1 is deposited over the wires. The micro-lens/polarizer array is ready for installation onto the InGaAs array. The transition regions at the edges of the lenses, in one embodiment, can be approximately 2 to 3 microns wide. These transition regions can be a source of light scatter and undesired cross-talk between neighboring super-pixels. To mitigate this source of error, the transition regions can be covered with black chrome (OD 2 blocking at up to wavelengths of 1.7 microns) or some other opaque or reflective material to reject the stray light.

Figure 4:
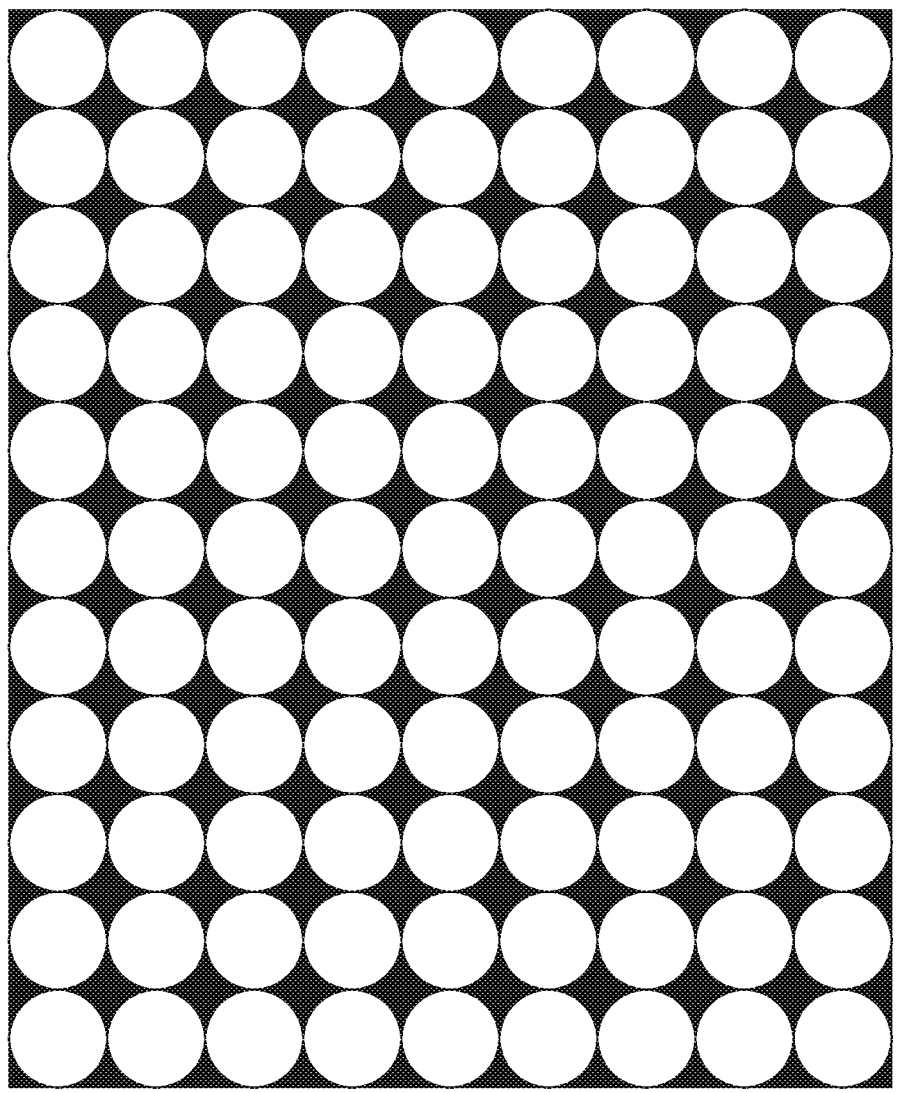
FIG. 4 is a depiction of the apertures for the pixels on the polarizer array.

One parameter for the proper and best functioning of the each pixel's wire grid polarizer is the diameter of the polarizer's circular apertures which, in one embodiment, comprise black chrome which is patterned abutting or over the top of the PPA pixels. That is, the apertures are positioned on the side of the PPA opposite the InGaAs FPA, which position means the apertures are between the PPA and the source of incident radiation. Depositing the aperture mask layer, in one embodiment the black chrome, is another processing step to the wafer. In other embodiments, the apertures may comprise a substance from the group consisting of chrome, aluminum and gold. Proper selection of aperture size minimizes optical cross talk between adjacent orthogonally polarized pixels. Cross talk occurs because the separation between the top layer of the InGaAs detector material and the light absorbing layer on the bottom is finite. Because of this separation, light impinging on one pixel can leak into the neighboring pixel. The extent of the cross-talk depends on the geometry of the FPA structure, which differs from one manufacturer to another. A mask (as shown in FIG. 4) included on top of the pixelated polarizers is designed to minimize cross-talk. The opaque mask consists of an opening or aperture aligned to each pixel of the wire grid polarizer array and each pixel of the FPA. The optimal diameter for each aperture needed to minimize cross-talk without unnecessarily blocking signal can range from about 50%-100% of the pixel width. The aperture mask shown in FIG. 4 is one embodiment and shows apertures that are about 95% of the pixel width. The aperture mask may be used without the micro-lenses or with the micro-lenses depending on the amount of cross-talk and the performance desired.

Once the polarization image data is collected, contrast enhancing algorithms that are known in the art can be applied to the polarization imagery. The polarization data exploits the polarization signatures to significantly enhance the information content in a scene. Non-restrictive examples include global mean, variance, and higher order moment analysis, Principal Component Analysis, or Linear Discriminate Analysis, computation of the statistics of the multidimensional data as a whole and then computation of local values based on a kernel convolved with the image as a whole and then normalized by global statistics of the scene, super resolution analysis.

In other embodiments, contrast enhancing algorithms are used in combinations that omit one or more of the steps. In other embodiments, the polarization image data, or the multi-dimensional (e.g. ColorFuse) data, may be viewed by humans for fluid detection, and no algorithms are applied.

I claim:

1. A short wave infrared polarimeter comprising: a PPA and an InGaAs FPA of equivalent pitches, the PPA comprising a first substrate and pixels for polarizing energy from a source, each said PPA pixel comprising a wire grid comprising wires laid directly on the first substrate and the InGaAs FPA comprising a second substrate and pixels comprising active areas, the PPA affixed to and parallel with the InGaAs FPA, and the PPA and the InGaAs FPA aligned so that the PPA pixels correspond one-to-one to the InGaAs FPA pixels and each of the PPA pixels transmits the polarized energy to one of the InGaAs FPA pixels, and further comprising a micro-lens array comprising a third substrate and pixels, said micro-lens array being positioned securely on a side of the PPA opposite the InGaAs FPA, said pixels of said micro-lens array having a dimension which is twice a corresponding dimension of the PPA pixels.

2. The short wave infrared polarimeter as in claim 1, wherein the PPA pixels are arranged in super-pixels, each said super-pixel comprising a 2×2 array of the PPA pixels in which the wires of each of the PPA pixels are positioned in one of four different polarization states.

3. The short wave infrared polarimeter as in claim 1, further comprising an aperture layer abutting the PPA, said aperture layer comprising a fourth substrate and an opaque mask, said opaque mask comprising circular openings comprising a diameter, said circular openings corresponding one-to-one to the PPA pixels, such that the energy from the source may pass through the circular openings to the PPA pixels.

4. The shortwave infrared polarimeter as in claim 3, wherein the diameter of the circular openings is within a range of 50-100% of the pitch of the PPA pixels.

5. The shortwave infrared polarimeter as in claim 1, wherein the PPA pixels produce a plane of polarization and transmission of a range of approximately 60% to 99% of the polarized energy to the InGaAs FPA pixels whose transmission axis is aligned with the plane of polarization.

6. The shortwave infrared polarimeter as in claim 1, wherein the polarized energy has a desired polarization state and an undesired polarization state, and there is an extinction ratio of the desired polarization state to the undesired polarization state.

7. The shortwave infrared polarimeter as in claim 6, wherein the extinction ratio is at least 10:1.

8. The shortwave infrared polarimeter as in claim 6, wherein the extinction ratio is approximately 1000:1.

9. The shortwave infrared polarimeter as in claim 6, wherein the extinction ratio is approximately 5000:1.

10. A shortwave infrared polarimeter comprising: a PPA and an InGaAs FPA of equivalent pitches, the PPA comprising a first substrate and pixels for polarizing energy from a source and said polarized energy having an extinction ratio of at least 100:1 of a desired polarization state to an undesired polarization state, each said PPA pixel comprising a wire grid comprising wires laid directly on the first substrate and the InGaAs FPA comprising a second substrate and pixels comprising active areas, the PPA affixed to and parallel with the InGaAs FPA, and the PPA and the InGaAs FPA aligned so that the PPA pixels correspond one-to-one to the InGaAs FPA pixels and each of the PPA pixels transmits at least 95% of the polarized energy to one of the InGaAs FPA pixels, and further comprising a micro-lens array comprising a third substrate and pixels, said micro-lens array being positioned securely on a side of the PPA opposite the InGaAs FPA, said pixels of said micro-lens array having a dimension which is twice a corresponding dimension of the PPA pixels.

* * * * *

UNITED STATES PATENT AND TRADEMARK OFFICE
CERTIFICATE OF CORRECTION

PATENT NO. : 10,031,026 B2
APPLICATION NO. : 15/498233
DATED : July 24, 2018
INVENTOR(S) : J. Larry Pezzaniti Page 1 of 1

It is certified that error appears in the above-identified patent and that said Letters Patent is hereby corrected as shown below:

In the Specification

Please replace the entire paragraph under the heading STATEMENT REGARDING GOVERNMENT SPONSORED RESEARCH with the following paragraph:
This invention was made with Government support under N00014-16-P-1033 and N68335-18-C-0049 awarded by Department of the Navy. The Government has certain rights in the invention.

Signed and Sealed this
Thirtieth Day of July, 2019

Andrei Iancu
*Director of the United States Patent and Trademark Office*